(12) United States Patent
Marchand (10) Patent No.: US 9,802,297 B2
(45) Date of Patent: Oct. 31, 2017

(54) TIGHTENING TOOL FOR A SCREW ELEMENT HAVING A LINE, AND COUPLING PART AND SCREW ELEMENT

(75) Inventor: Claude Marchand, Hoelstein (CH)

(73) Assignee: Labomatic Instruments AG, Allschwil (CH)

( * ) Notice: Subject to any disclaimer, the term of this patent is extended or adjusted under 35 U.S.C. 154(b) by 806 days.

(21) Appl. No.: 14/113,082

(22) PCT Filed: Apr. 23, 2012

(86) PCT No.: PCT/EP2012/057410
§ 371 (c)(1),
(2), (4) Date: Jan. 6, 2014

(87) PCT Pub. No.: WO2012/143569
PCT Pub. Date: Oct. 26, 2012

(65) Prior Publication Data
US 2014/0144300 A1    May 29, 2014

(30) Foreign Application Priority Data

Apr. 21, 2011   (DE) ........................ 10 2011 018 465

(51) Int. Cl.
*F16B 23/00*    (2006.01)
*B25B 13/50*    (2006.01)
(Continued)

(52) U.S. Cl.
CPC ............ *B25B 13/50* (2013.01); *B25B 13/065* (2013.01); *B25B 13/481* (2013.01);
(Continued)

(58) Field of Classification Search
CPC ..... B25B 13/48; B25B 13/481; B25B 13/065; B25B 13/06; B25B 13/50; F16B 23/0007;
(Continued)

(56) References Cited

U.S. PATENT DOCUMENTS 798,325 A  *   8/1905  Daddysman, Jr. ...... B25B 13/08
                                                     16/429
4,227,429 A  *  10/1980 Bowers, Jr. ............ B25B 13/06
                                                     81/176.15
(Continued)

FOREIGN PATENT DOCUMENTS

DE   102010011095 A1   10/2010
FR       2907701 A1    5/2008
(Continued)

*Primary Examiner* — David B Thomas
(74) *Attorney, Agent, or Firm* — Leech Tishman Fuscaldo & Lampl; Kenneth D'Alessandro, Esq.

(57) ABSTRACT

Disclosed is a tightening tool for a screw element, having a tool receptacle and an associated line. A coupling part is provided, which is formed at a free end for engaging with the tool receptacle in a form-closed manner and transitions into a handle or can be coupled to a handle at the other end. The coupling part has an interior and at least one lateral opening for inserting or leading out the line at least at the free end of the coupling part. The interior and the opening extend to the free end and are open there. The invention further relates to a coupling part and to a screw element.

2 Claims, 9 Drawing Sheets

(51) Int. Cl.
*B25B 13/06* (2006.01)
*B25B 23/142* (2006.01)
*B25B 13/48* (2006.01)

(52) U.S. Cl.
CPC ........ *B25B 23/142* (2013.01); *F16B 23/0007* (2013.01); *F16B 23/0061* (2013.01)

(58) Field of Classification Search
CPC ..... F16B 23/0061; F16L 15/08; F16L 15/006; F16L 41/10
See application file for complete search history.

(56) References Cited

U.S. PATENT DOCUMENTS

| | | | | |
|---|---|---|---|---|
| 4,749,251 A * | 6/1988 | Moulin | ................ | H01R 13/622 385/134 |
| 5,378,101 A | 1/1995 | Olson et al. | | |
| 5,507,209 A | 4/1996 | Allen et al. | | |
| 5,673,976 A * | 10/1997 | Hillis | ................ | B25B 13/48 301/58 |
| H1689 H * | 11/1997 | Foucher | ................ | B25B 13/08 81/124.2 |
| 5,911,954 A * | 6/1999 | Ford | ................ | B01D 15/08 210/198.2 |
| 6,122,997 A * | 9/2000 | Altura | ................ | B25B 13/48 81/119 |
| 6,450,069 B1 * | 9/2002 | Brahmbhatt | ................ | B25B 13/02 81/124.4 |
| RE37,868 E * | 10/2002 | Hillis | ................ | B25B 13/48 301/58 |
| 6,463,833 B1 * | 10/2002 | Lund | ................ | B25B 13/02 81/124.2 |
| 6,474,201 B1 * | 11/2002 | Lund | ................ | B25B 13/02 81/124.2 |
| 6,725,747 B2 * | 4/2004 | Erwin | ................ | B25B 13/06 81/124.2 |
| 7,080,581 B2 * | 7/2006 | Reese | ................ | B25B 13/06 81/124.2 |
| 7,272,996 B2 * | 9/2007 | Pontieri | ................ | B24B 45/003 81/176.15 |
| 7,347,129 B1 * | 3/2008 | Youtsey | ................ | B25B 13/06 81/124.2 |
| 7,387,049 B1 * | 6/2008 | Ver Hage | ................ | A01K 7/00 53/490 |
| 7,975,578 B2 * | 7/2011 | Youtsey | ................ | B25B 13/06 81/124.2 |
| 8,037,788 B2 * | 10/2011 | Proper | ................ | B25B 13/48 210/198.2 |
| 8,206,071 B1 * | 6/2012 | Johnson | ................ | B25B 13/065 411/178 |
| 8,347,761 B2 * | 1/2013 | Goss | ................ | B25B 13/065 81/120 |
| 8,393,253 B2 * | 3/2013 | Johnson | ................ | B25B 13/065 81/124.6 |
| 9,194,417 B2 * | 11/2015 | Marchand | ................ | F16B 31/027 411/7 |
| 2004/0035259 A1 * | 2/2004 | Erwin | ................ | B25B 13/06 81/124.2 |
| 2004/0035260 A1 * | 2/2004 | Adkison | ................ | B25B 13/06 81/124.2 |
| 2004/0093996 A1 * | 5/2004 | Fu | ................ | B25B 13/065 81/121.1 |
| 2006/0068623 A1 | 3/2006 | Purdy | | |
| 2006/0243102 A1 * | 11/2006 | Vines | ................ | B25B 13/06 81/124.2 |
| 2008/0066584 A1 * | 3/2008 | Vines | ................ | B25B 13/06 81/124.2 |
| 2008/0098858 A1 * | 5/2008 | Thomas | ................ | B25B 13/02 81/124.2 |
| 2008/0121073 A1 * | 5/2008 | Williams | ................ | B25B 13/02 81/121.1 |
| 2010/0018359 A1 | 1/2010 | Proper | | |
| 2010/0156089 A1 * | 6/2010 | Zelechonok | ........ | G01N 30/6039 285/24 |
| 2011/0298210 A1 * | 12/2011 | Hochgraeber | ..... | G01N 30/6026 285/357 |
| 2013/0081520 A1 * | 4/2013 | Grek | ................ | B25B 13/06 81/119 |
| 2013/0192039 A1 * | 8/2013 | Trusty | ................ | B25B 13/06 29/426.5 |
| 2014/0123819 A1 * | 5/2014 | Beemer | ................ | B25B 23/142 81/476 |

FOREIGN PATENT DOCUMENTS

| | | |
|---|---|---|
| GB | 1458090 | 12/1976 |
| JP | 8243941 A | 9/1996 |
| WO | 8700352 A1 | 1/1987 |

\* cited by examiner

Schnitt A-A

TIGHTENING TOOL FOR A SCREW ELEMENT HAVING A LINE, AND COUPLING PART AND SCREW ELEMENT

CROSS-REFERENCE TO RELATED APPLICATIONS

This application is the United States national phase of International Application No. PCT/EP2012/057410 filed Apr. 23, 2012, and claims priority to German Patent Application No. 102011018465.1 filed Apr. 21, 2011, the disclosures of which are hereby incorporated in their entirety by reference.

BACKGROUND

The present invention relates to a fastening tool for a screw element having a tool mount and an associated line, as well as to a coupling part for the fastening tool and to a screw element configured for a cooperation with the coupling part and/or the fastening tool.

Screw elements which serve for the attachment of a line to a counterpiece, be it to a connector to a further line or to a terminal at a housing of a device or to a pneumatic or hydraulic installation are known in a large variety. The connections can be inputs or outputs. The lines can be composed of metal and/or of plastic and can be configured rigid or flexible. The screw elements can have the shape of hollow bolts or of screw sockets or can be configured as a sleeve nut. Also screw elements for the fastening of electric lines to electric devices are used. Such screw elements frequently have the shape of hollow screw bolts which comprise a ring-shaped sealing element and/or a clamping element for the line, as well as a line guided through the sealing element.

In particular in the field of the analytical, preparatory or industrial chromatography and in the field of medical diagnostics and in the field of laboratory devices in general, relatively thin hoses of plastic, which in operation are frequently subjected to a high pressure, are frequently connected to the corresponding devices by means of a screw elements of plastic, for example, to HPLC devices, MPLC devices or LPLC devices and/or to chromatography columns. In this connection a considerable number of lines can be connected to a device. It happens time and again that the accessibility of the screw elements is difficult due to the limited spatial conditions. In this connection, it can indeed happen that corresponding screw elements can only be turned over small angular ranges. Under these circumstances it is also difficult to ensure that the screw elements are sufficiently tightened, however, not so tight that the thread of the screw element, which is frequently composed of plastic, is damaged or that the screw element is tightened so hard that the seal of the plastic hose is no longer ensured be it due to a deformation or a damaging of the hose and/or of a provided seal.

Furthermore, a problem exists with respect to screw elements in that, due to the narrow spatial conditions it, is striven for to make the screw elements themselves as small as possible. Since the lines which are guided through the screw elements take on a considerable areal region of the end face of the screw element and cannot always be made smaller, the space available for the attachment of the fastening tool is very limited. The problem is in many cases even more pronounced when protectors against kinks for the flexible lines are provided, for example, having the shape of spiral wires, since space has to also be provided for these elements. Moreover, due to the narrow spatial conditions it is frequently difficult to place a fastening tool at the screw elements.

BRIEF DESCRIPTION

The object of the present invention lies therein to provide a fastening tool, as well as a coupling part and a screw element of the initially named kind which ensures a reliable fastening of such screw elements also for narrow spatial conditions, which is also easy to handle. Furthermore, the object exists of designing a screw element in such a way that it works reliable albeit the narrow spatial conditions and can be fastened and at the same time simplifies the attachment of the fastening tool.

In order to satisfy this object a fastening tool, a coupling part and a screw element is provided.

Thus, a fastening tool for a screw element having a tool mount and an associated line is used in accordance with the invention which is characterized in that a coupling part is provided which is configured at a free end for the shape matching engagement with the tool mount and at the other end, its drive end, merges into a handle or can be coupled to a handle, and in that the coupling part has at least an inner space at its free end and at least one lateral opening for the introduction and/or removal of the line, wherein the inner space and the opening extend up to the free end and being open there.

The fastening tool can be brought into engagement with the tool mount via the line through the formation of the coupling part, wherein the inner space of the coupling part has to be dimensioned so large that the line has space therein, this means that the cross-section of the inner space has to be larger than the cross-section of the line. The lateral opening, on the one hand, enables a lateral or radial movement of the coupling part towards the line and subsequently an axial movement of the coupling part and/or of the fastening tool up until the free end of the coupling part arrives in the shape matching engagement with the tool mount. In this connection, the free end of the coupling part has a shape which is approximately complementary to the tool mount in such a way that a torque can be transferred via the coupling part to the screw element. For an applied fastening tool the line runs axially from the screw element through the hollow inner space of the coupling part and in a bent shape laterally through the said opening of the coupling part.

When the line is a flexible line, such as a hose made of plastic, which is generally the case, the flexibility of the line is sufficient in order to form the above mentioned bent shape of the line on the removal of the coupling part and further enables a limited rotational movement of the coupling part and for this reason of the screw element without damaging the line. In the event that it is a rigid line, for example, made of metal then the said opening has to be longer than the spacing from the screw element to the side of the flexible line remote from the screw element and must at least at the position of the removal of the line be configured wide enough such that a limited rotational movement of the coupling part and/or of the fastening tool for fastening of the screw element is possible. Following a limited rotational movement of the coupling part and/or of the fastening tool this can, if required, be axially removed from the tool mount of the screw element and can be turned back by a maximum possible limited amount and can be newly placed, wherein a further limited rotational movement of the screw element is possible. This method can be repeated up until the screw element has been fastened. When the available space is sufficient, the screw element can be screwed by use of fingers and can then subsequently be fastened by means of the fastening tool. In dependence on the actual circumstances, a single rotational movement of the fastening tool in a limited angular range can be sufficient to facilitate this, this means that the fastening tool does not have to be newly placed. Since the coupling part can be designed relatively thin, but with a sufficient length, the free end of the coupling part can also be used for narrow spatial conditions for the fastening of screw elements which would otherwise be inaccessible.

Although the tool is referred to as a fastening tool it can also be used for the release of screw elements without further ado.

It is particularly favorable when the fastening tool is configured as a torque wrench.

Hereby it is possible to fasten the corresponding screw elements to a maximum predefinable torque which in turn has the effect that the required seal of the line is ensured and that the thread is not damaged. Furthermore, the maintenance of a predefined torque ensures that, specifically for PTFE and FEP lines, the applied pressure does not become so large and that an undesired flow of the hose material occurs. Furthermore, the torque by means of which the fitting (the screw element) is tightened, is limited by means of the torque limitation, whereby the pressing together of the flange, of the support ring (if present) and possibly of an O-Ring present between the fitting and the support ring or an O-ring provided at a different position is limited, this means that an excessive pressing together is prevented.

Likewise it is favorable that the free end of the coupling part is provided with projections extending in an axial direction of the coupling part which engage into the longitudinal grooves of the screw element forming the tool mount in a shape matching manner. Such longitudinal grooves are preferably configured at the outer side of the screw element and are open in the direction radially outwardly. This means that the coupling part does not have to be wider than the screw element itself in the region of the screw element which favors the placing of the fastening tool also for particularly narrow spatial conditions.

However, it is not necessarily required that the longitudinal grooves are open radially towards the outside. Rather more, they can, for example, be replaced by axially in parallel bores, although these are not as favorable for the accessibility as the formation having longitudinal grooves which are open radially outwardly or at least means that the screw element has to be designed larger in the region of this head than for the formation with longitudinal grooves which are open radially towards the outside.

For such fastening tools the projections are configured free-standing which is particularly favorable in order to be able to place the fastening tool onto the screw element. Furthermore, the use of free-standing projections has the effect that the fastening tool, in particular on the use of run in inclinations with respect to the said longitudinal grooves, or one use of rounded edges of the projection can be brought into engagement with the head part of the screw in a simple manner or can be "threaded in" easily and indeed also then when the visibility conditions are not ideal due to the presence of a plurality of screw elements and for narrow spatial conditions and/or when the fastening tool is guided towards the respective screw element with a non-ideal orientation.

In accordance with a preferred embodiment the coupling part is configured with a socket mount for the handle at its end remote from the free end.

The fastening tool can be configured in such a way that the handle is realized as a screwdriver handle and as a ratchet. In both cases the handle can be configured with a function predefining or limiting a torque.

The opening preferably extends over a large part of the length of the coupling part and/or over the overall length of the same. This has the advantage that for a given flexibility of the line the largest possible rotational movement of the fastening tool can be achieved before it has to be newly placed.

In accordance with a very preferred embodiment the projections have a circular shape and are preferably formed by cylinder pins which are held with a press fit in annularly arranged bores extending in the axial direction at the associated free end by means of an adhesive or are held in a different manner in annularly arranged bores extending in the axial direction at the associated free end.

This construction can be realized relatively simply from a manufacturing point of view, since both the pins, produced by wire elements, and the bores, produced with small drills, can be produced in the required quality and with the required tolerance. The difficulties which are present on their manufacture can be appreciated when one uses the knowledge that the dimensions of the projections and/or of the cylinder pins for the typical screws in the analytic field have diameters of less than 1 mm and can project by approximately 6 mm over the free end of the coupling part.

In a further preferred embodiment a web extends between the free end facing the handle and the free end bearing the projections, wherein the angular extent of the web about the longitudinal axis is smaller than the angular extent of the opening about the longitudinal axis and preferably lies in the range of ≤120° and, in particular of ≤90°. The web is preferably maintained as small as possible. It must merely be capable of transmitting the maximum required torque reliably between the free ends of a coupling part. Due to the fact that the web is provided with an as small as possible angular extent, the opening in the region between the free end can be carried out as large as possible, whereby an as large as possible rotational range of the fastening tool can be achieved for an as small as possible hindrance through the respective line. Although the web has an as small as possible angular extent about the central longitudinal axis of the coupling part it can have a certain thickness in the radial direction which contributes to the magnitude of the transferable torque without the radial thickness itself representing a hindrance on the application of the fastening tool.

In a different preferred embodiment the opening has a larger extent in a region between the handle and the free end bearing the projections than in the region of this free end.

In a further preferred embodiment the free end remote from the handle is configured as a ring with a slot-like opening and the slot-like opening has an angular extent and/or a width which is smaller than the angular extent of the ring and/or of the circumference of the ring. Specifically the slot-like opening is dimensioned precisely so wide and/or is provided with an angular extent in such a way that the respective line can just be threaded in through the slot-like opening.

This, on the one hand, simplifies the attachment of the fastening tool, since it can be brought into engagement at the line remote from the head part of the screw element and can then be guided along the line up to the head part of the screw element without the danger arising that the fastening tool is brought out of engagement from the line. Thus a better guidance of the fastening tool arises. On the other hand, the small width of the slot-like opening serves the purpose that the circumference of the ring is as long as possible and for this reason that as many as possible axially extending projections can be provided at the free end face of the ring. In any case one can provide a sufficient amount of projections in this manner such that they engage in several longitudinal grooves at the circumference of the head part of the screw element and so to say cannot be removed laterally from the engagement with the head part of the screw.

Typically, the slot-like opening has an angular extent of approximately 90°, while the ring has an angular extent of approximately 270°.

Preferably, the handle extends in an axial direction from the coupling part. Hereby a relatively narrow longitudinal fastening tool is created which can be handled easily in the region of the corresponding apparatuses and connections.

In a preferred embodiment the coupling part is made as a plastic or a metal injection-molded part or as a plastic or a metal extruded part, preferably a part made of an aluminum alloy. Thus, a coupling part can be produced particularly cost-effectively, simply and quickly.

In a further preferred embodiment the coupling part at its drive end is configured with a like arrangement of radially inwardly projecting projections extending in an axial direction as at the free end, which arrangement can be coupled to a drive end of a handle and/or of a torque wrench having a complementary shape.

In a different preferred embodiment, the arrangement of the projections and the wall thickness of the tubular piece are selected in such a way that a hollow square shape or a hexagonal shape or a torx shape can be produced at the drive end which can be coupled to a complementary square element, hexagonal element or torx element, on the formation of the coupling part as an extruded part.

The invention further comprises a coupling part which is configured for the use with such a fastening tool of the previously described type. Such coupling parts cannot only be sold separate from the handle and/or from the torque limiting wrench, but different coupling parts can be sold and/or used for different screw element sizes having a handle matching all of the coupling parts.

Finally, a screw element having a tool mount is claimed in accordance with the invention which is configured for the cooperation with a coupling part in accordance with the invention.

Such a screw element in particular has a head part which is configured for the engagement of a tool, having a shaft part bearing a threaded cylinder and having a central bore which is configured for the reception of a flexible line. In accordance with the invention the head part is provided with longitudinal grooves at its outer side extending in a longitudinal direction from an end face of the head part which are e.g. semi-circular in cross-section and wherein run in regions for the longitudinal grooves are provided at the said end face which run in regions taper in the direction of the longitudinal grooves and indeed preferably taper in a conical manner, wherein the screw element is either configured as a hollow screw bolt or as a sleeve nut.

The provision of such longitudinal grooves is particularly favorable, since as much space as possible is created for the line and a possibly provided protection against kinks through the engagement of the fastening tool at the outer side of the head part without the diameter of the head part having to be unnecessary large.

In an embodiment the screw element is configured as a hollow grub screw and the longitudinal grooves are arranged in a region of the grub screw forming the head part. Such a grub screw requires no space at its head part which projects beyond the threaded bore.

Such screw elements can be provided with a cutout between the head part and the threaded cylinder which is, in particular configured to receive a coding ring or a similar element. Such preferably color-coded coding rings enable a simple introduction of screw elements, e.g. into a housing when the place of installation is coded with the same color.

Preferably, such a screw element is produced as a plastic or a metal injection-molded part and/or as a (turned) automated part. Particularly preferred embodiments of the invention are defined in the subordinate claims.

BRIEF DESCRIPTION OF THE DRAWING FIGURES

The invention will be described in detail in the following by means of embodiments with reference to the drawing in which is shown:

FIGS. 6A+6B show a further screw element in accordance with the invention in a perspective view and in a top view;

FIGS. 7A+7B show a further coupling part in accordance with the invention in a perspective view and in a top view.

DETAILED DESCRIPTION

Figure 1A:
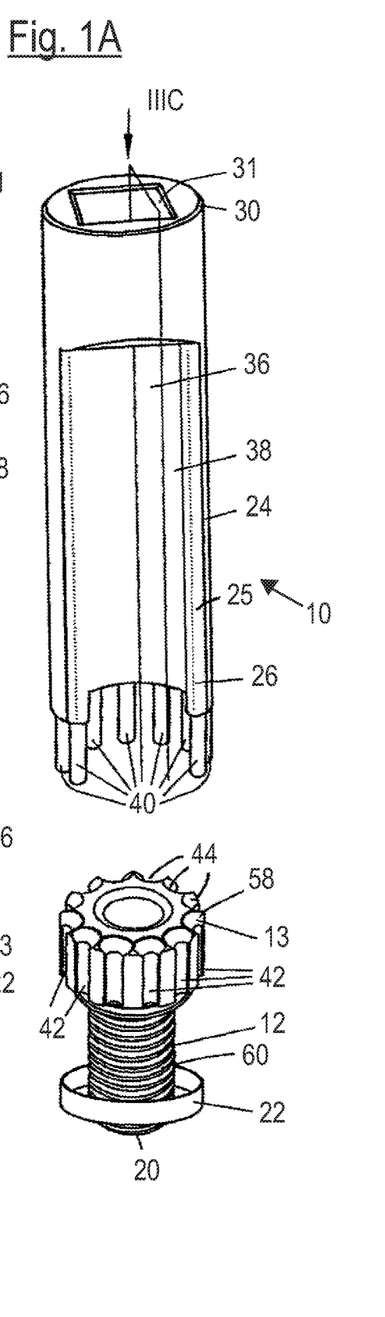
FIG. 1A a side view of a coupling part in accordance with the invention having a screw element in accordance with the invention prior to the application of the coupling part.
Figure 1B:
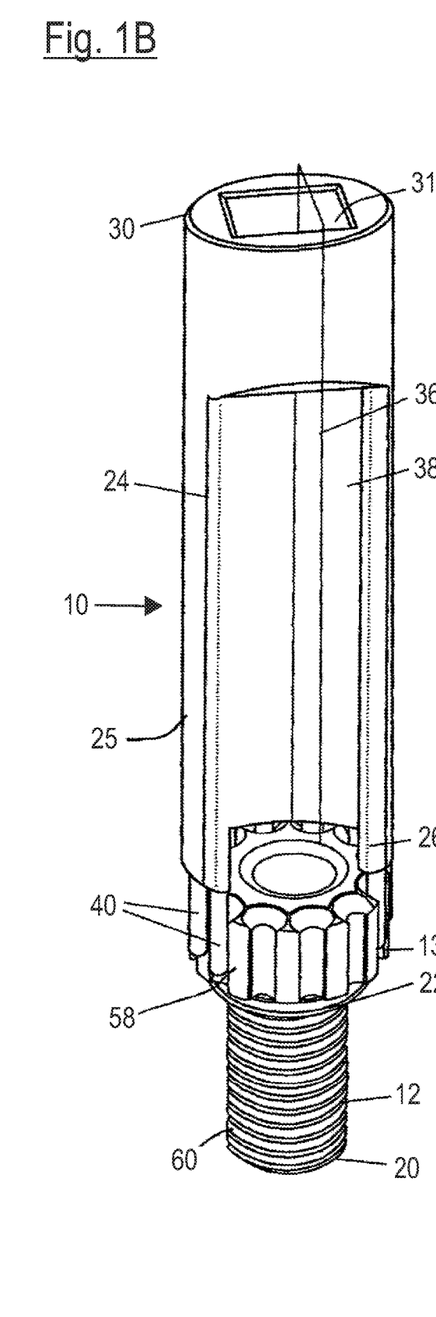
FIG. 1B the coupling part of FIG. 1A following the application onto the screw element.
Figure 1C:
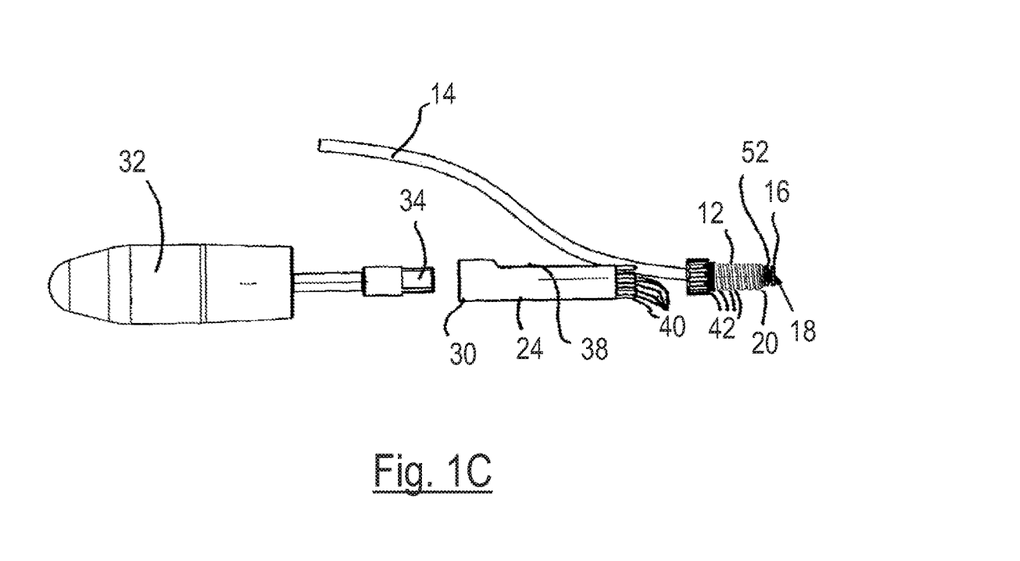
FIG. 1C an illustration corresponding to that of FIG. 1B, but having a smaller dimension and being completed with a handle and a line.
Figure 1D:
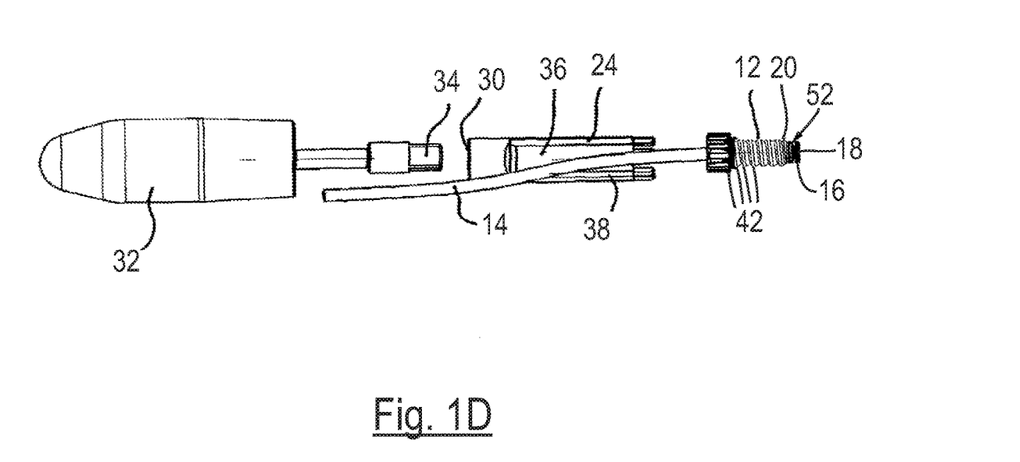
FIG. 1D a further illustration similar to that of FIG. 1C, but turned by 90° in the clock-wise direction.
Figure 2A:
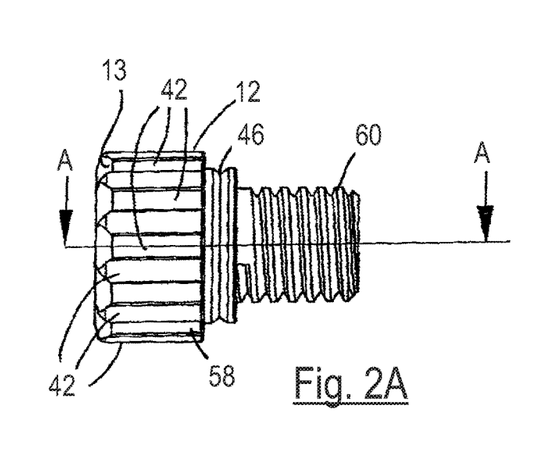
FIGS. 2A-2D different views of a screw element in accordance with the invention from the side (FIG. 2A), in an end view (FIG. 2B), a section in the longitudinal direction (FIG. 2C) and in a perspective illustration (FIG. 2D)
Figure 2B:
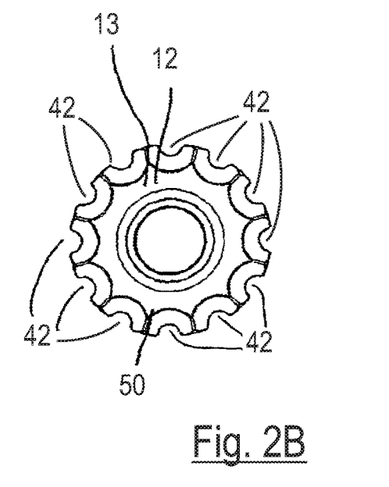
Figure 2C:
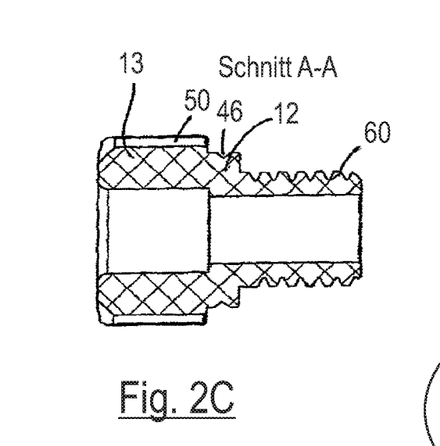
Figure 2D:
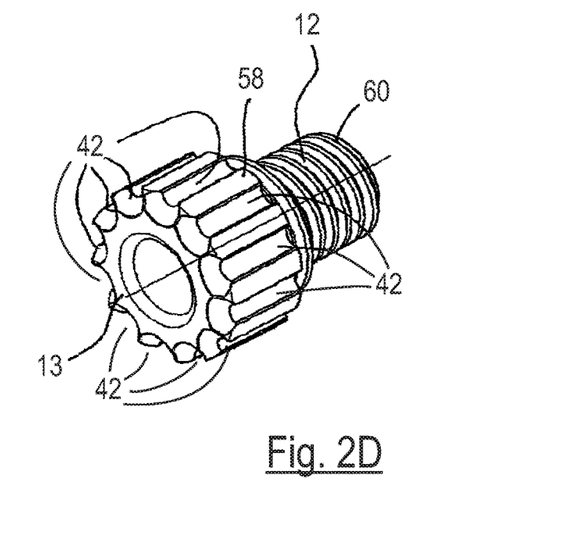

With reference to FIGS. 1A to 1D, but simultaneously also to the further Figures, the FIGS. 1C and 1D show a fastening tool 10 in accordance with the invention for a screw element 12, having a tool mount 13 and having an associated line 14. The line 14 in this example is composed of plastic and has a flange 18 provided at the end 16 facing the screw element 12 which flange is typically generated by forming and/or pressing the cutoff end of the line 14 over in a heated state. On the screwing of the screw element 12 into a connector of a housing, or into a connection piece, the flange is held between a support ring (not shown) at the end face 20 of the screw element 12 and a shoulder at an end of a threaded bore of the connector (not shown). The reference numeral 22 in FIG. 1A indicates a known color-coding ring which sits in a ring groove and/or at a ring shoulder of the screw element 12 at the side of the head of the screw element 12 facing the thread.

The reference numeral 24 represents a coupling part which at its free end 26 facing the screw element 12 (FIGS. 1B and 1C) is configured for the shape matching engagement with a tool mount 13 of the screw element 12. At its other end 30 the coupling part 24 has a mount, in the present example in the shape of a square opening 31 in cross-section, for a handle 32 which can be inserted into the end 30 of the coupling part with a corresponding complementary shape, for example, a common square shape 34. Thus the coupling part in this example can be coupled to the handle 32. Otherwise, the corresponding "end" of the coupling part 24 can merge into the handle 32, this means that it can be fixedly coupled thereto.

In other words, the coupling part is configured with a plug mount for the handle 32 at its end 30 remote from the free end 26 and the handle 32 can be configured as a screwdriver handle or as a ratchet. In both cases the handle can be configured with an installed function predefining or limiting the torque.

The coupling part 24 further comprises at least one inner space 36 at its free end 26 and/or in the region of its free end 26 and at least one lateral opening 38 for the introduction and/or removal of the line 14, wherein the inner space 36 and the opening 38 extend up to the free end 26 and are open there.

The handle 32 is preferably configured as a torque wrench. Such handles 32 having the shown shape of a screwdriver handle are commercially available from the company Wika. Instead of this, a common torque wrench having a square end can be used with the coupling part 24 in accordance with the invention.

The free end 26 of the coupling part 24 is provided with free-standing projections 40 which extend in an axial direction of the coupling part and which engage the tool mount 13 of the screw element 12 formed by longitudinal grooves 42 and/or which engage into the screw head of the screw element in a shape matching manner. The longitudinal grooves 42 are configured at the outer side of the screw element 12 and are open in a radially outward direction. At their ends facing the coupling part 24 the longitudinal grooves 42 have conical run in regions which enable the introduction of the projections 40 into the coupling part 24.

Figures 6A, 6B, 7A, 7B:
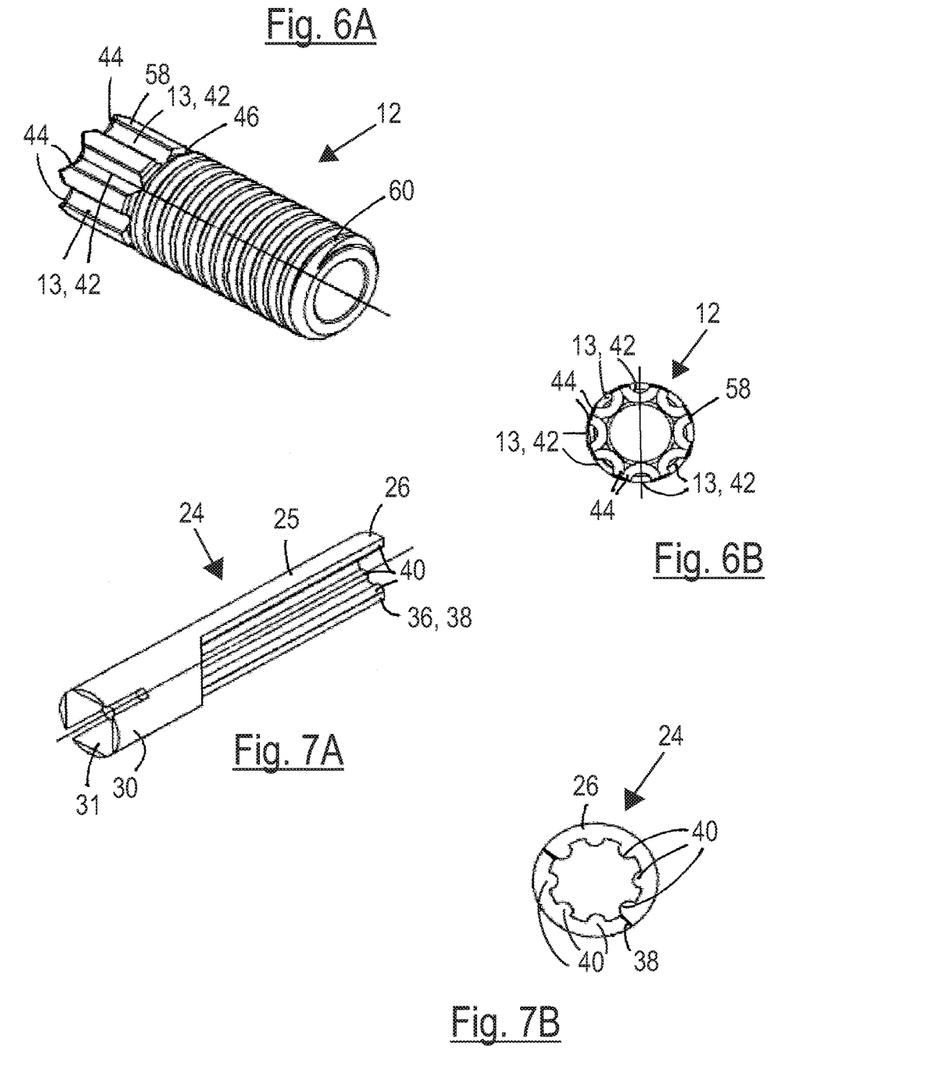

The projections 40 have a cylindrical shape (see FIG. 6) so that, on their introduction, they can be guided particularly efficiently into the longitudinal grooves 42 of the screw element 12 through the conical shape of the run in regions 44 of the screw element 12. Thereby it is ensured that the projections 40 can find their own way into the longitudinal grooves 42 in such a way that the coupling part 24 can be brought into engagement with the screw element 12 without too much demand in effort. Thus, a relatively simple fastening and/or loosening of the screw elements is ensured by means of the coupling part 24. This is particularly advantageous when the screw element 12 has to be installed in relatively small apparatuses where little space is present.

It is in particular evident from FIG. 1C that the opening 38 extends over a large part of the length of the coupling part 24, i.e. nearly over the overall length of the same. FIG. 1D shows a further illustration similar to that of FIG. 1C, where the coupling part is, however, rotated about 90° in the clock-wise direction.

On use of the fastening tool the handle 32 and the coupling part are normally connected first, this means that the square of the handle 32 is plugged into the plug mount 31 of the coupling part 24. Following this, the coupling part 24 is moved sideways over the line 14 in such a way that this approximately takes on a position in accordance with FIG. 1A. Only then is the fastening tool moved axially with respect to the central longitudinal axis of the screw element 12 and the line 14 is moved into the region of the screw element 12 in such a way that the projections 40 engage with the longitudinal grooves of the screw element 12 (cf. FIG. 1C). Following this, a torque can be exerted onto the handle 32 and onto the screw element 12 via the coupling part 24. However, the coupling part 24 can first be placed onto the line 14 and then can be brought into engagement with the screw element 12, before the handle 32 is plugged into the coupling part 24.

The inner space 36 of the coupling part 24 is dimensioned so large that the line 14 has space therein, this means that the cross-section of the inner space 36 must be larger than the cross-section of the line 14 and the diameter of the cylindrical inner space 36 is preferably at least twice or three times as large as the outer diameter of the line 14. The lateral opening 38, on the one hand, enables a lateral or radial movement of the coupling part 24 towards the line 14 and subsequently an axial movement of the coupling part 24 and/or of the fastening tool 12 up until the free end 26 of the coupling part 24 arrives in the shape matching engagement with the tool mount 13 of the screw element 12. In this respect the free end 26 of the coupling part and/or the projections 40 provided there have a shape which is approximately complementary to the tool mounts 13 in such a way that a torque can be transmitted from the handle 32 to the screw element 14 via the coupling part 24.

Figure 3A:
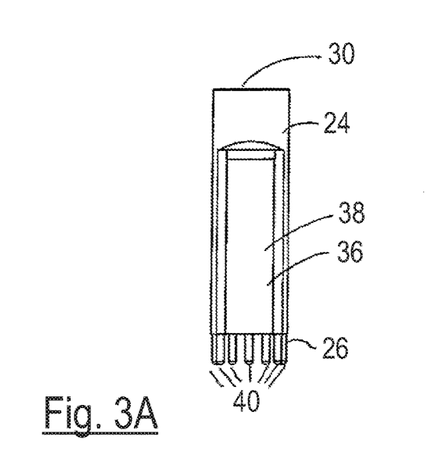
FIGS. 3A-3F different views of a coupling part in accordance with the invention from the side (FIG. 3A), in an end view (FIG. 3B), in a side view (FIG. 3C) in accordance with the arrow IIIC of the FIG. 1A, as well as in two perspective illustrations (FIGS. 3D and 3E) and in a further end view (FIG. 3F)
Figure 3B:
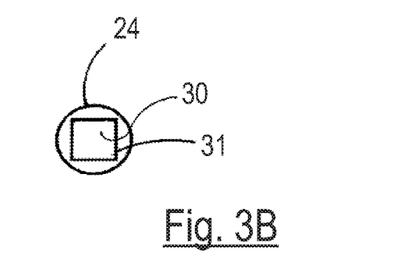
Figure 3C:
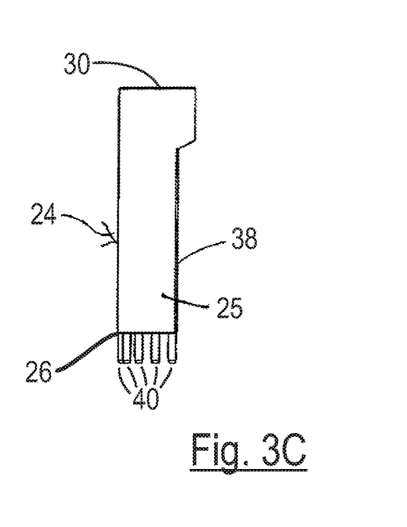
Figure 3D:
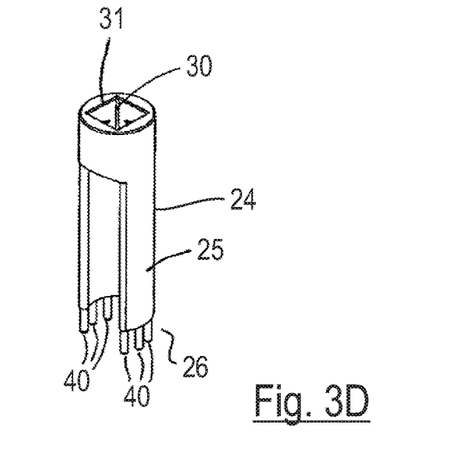
Figure 3E:
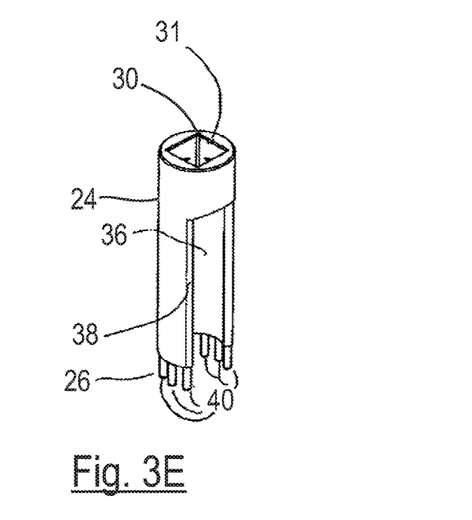
Figure 3F:
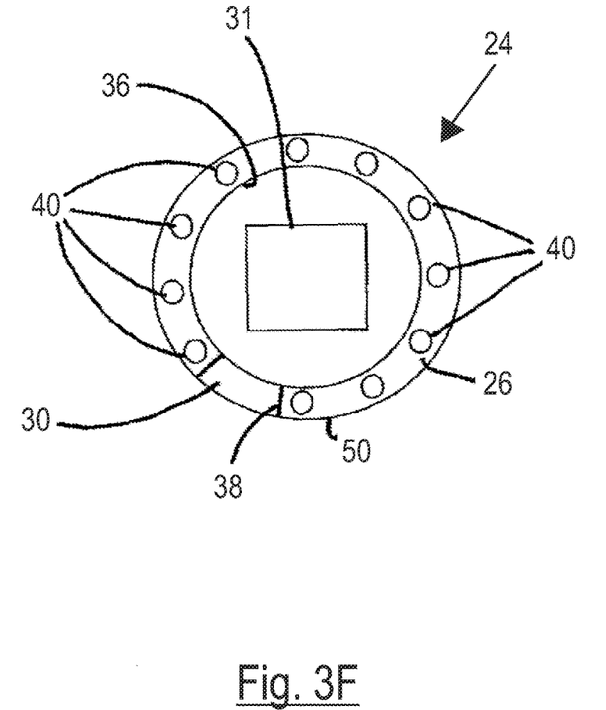

FIG. 3F shows a further end view of a coupling part 24 in accordance with FIGS. 3A to 3E. In this example the circular cross-section of the circular projections 40 can be seen. The projections 40 are preferably formed by cylinder pins which are held with a press fit in annularly arranged bores extending in the axial direction at the associated free end by means of an adhesive or are held in a different manner in annularly arranged bores extending in the axial direction at the associated free end. This construction can be realized relatively simply from a manufacturing point of view, since both the pins, produced by wire elements, and the bores, produced with small drills, can be produced in the required quality and with the required tolerances.

Figure 4A:
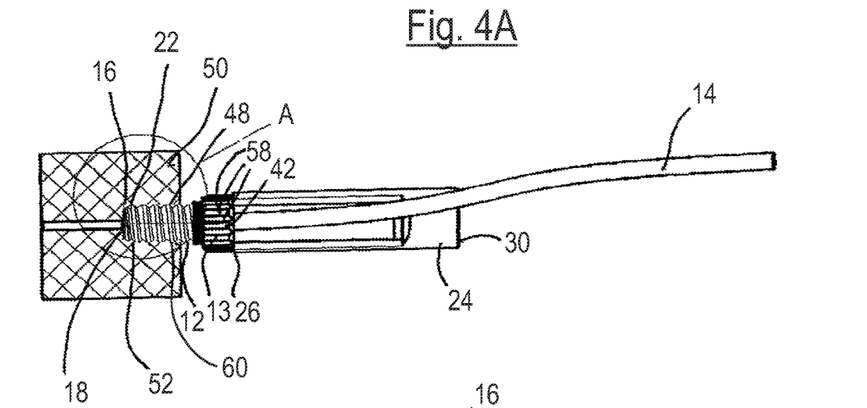
FIG. 4A a partly sectioned illustration of a screw element on the introduction into a threaded connector bore of a housing, wherein the handle has been omitted for reasons of clarity.
Figure 4B:
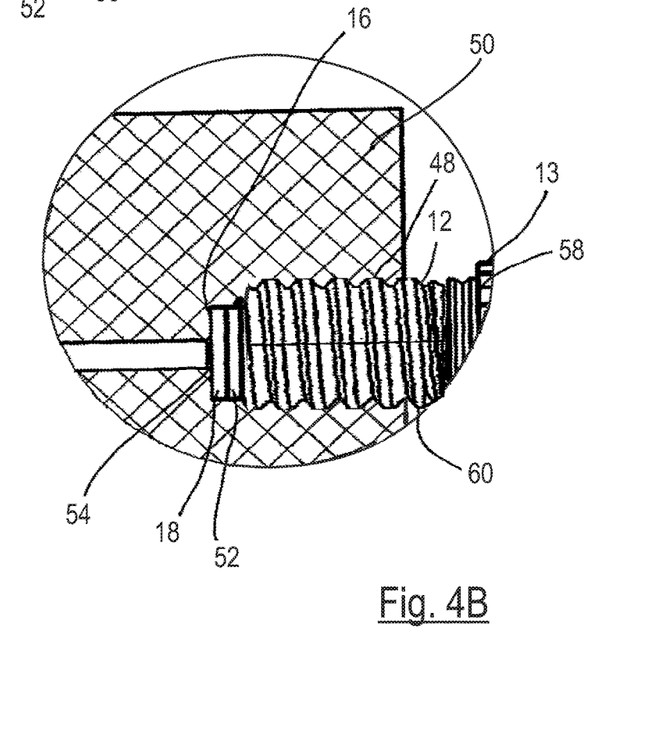
FIG. 4B an enlarged illustration of the screw element screwed into the connection.
Figure 5A:
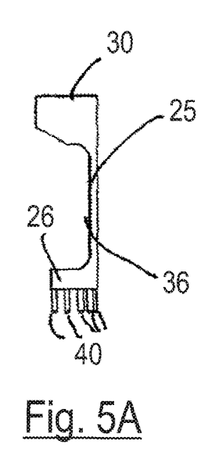
FIGS. 5A-5F further views of a further fastening tool similar to that of FIGS. 1A to 1D, wherein the opening of the coupling part in accordance with the invention, but is of significantly wider design.
Figure 5B:
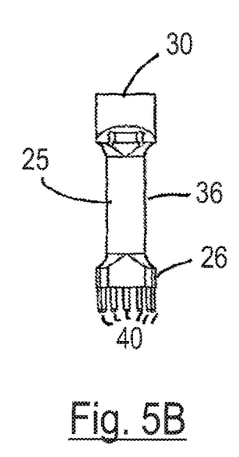
Figure 5C:
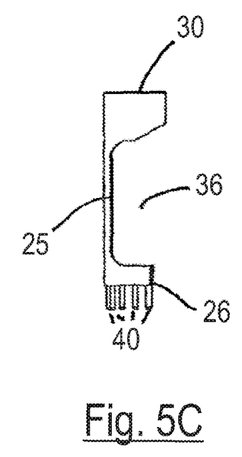
Figure 5D:
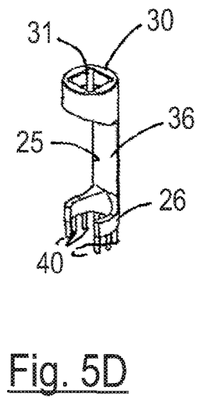
Figure 5E:
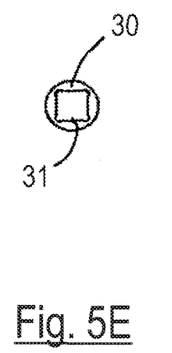
Figure 5F:
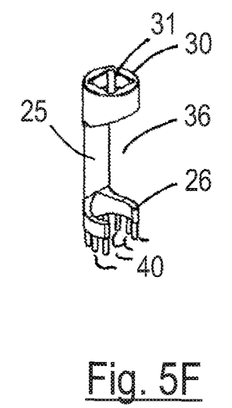

In the FIG. 4A a partly sectioned illustration of a screw element 12 is shown on the introduction into a threaded bore connector 48 of a housing 50, wherein the handle 32 has been omitted in the illustration. The FIG. 4B shows an enlarged illustration of the screw element 12 screwed into the connector 48. The FIG. 4B further shows how the end face 20 of a screw element presses against a support ring 52 and via this onto the flange 18 of the line 14 and presses the flange to the base 54 of the threaded bore 48 for a screwed in screw element 12.

The FIG. 5A to 5F show an alternative coupling part 24 in which the opening 36 has a considerable width which extends over approximately 270° of the circumference of the coupling part 24 (wherein this angular statement should be understood purely by way of example and not in a limiting manner). In accordance with this a relatively narrow web 25 remains which connects the free drive end 26 to the handle side end 30. Thus, the fastening tool can be turned over an extended angular range in order to bring about a corresponding large angular dependent fastening movement of the screw element 12. It should finally be noted that the opening 36 can have a different shape, for example a T-shape, wherein the opening can, for example, be narrower in the region of the drive end 26 and wider in the region of the handle side end 30.

The width of the web 25 is selected in such a way that the transfer of a torque to the screw element 12 is ensured via the coupling part 24. Typically, torques in the ranges of 0.05 to 2 Nm, in particular of 0.1 to 1 Nm are used for plastic screws 12 in dependence on the size of the screw element. For metal screws 12, a torque of approximately 0.1 to 120 Nm, preferably between 2 and 50 Nm can be transmitted to the screw element by means of the coupling element 24 in dependence on the metal and the size.

FIGS. 6A and 6B show a further screw element 12 in a perspective view and in a top view. In this embodiment the screw element 12 is configured as a hollow grub screw and the longitudinal grooves 42 are arranged in a region of the grub screw 12 forming the head part 58. Such a grub screw 12 does not require any space at its head part 58 which projects beyond the threaded bore. The screw element 12 has a head part 58 which can be configured for the engagement of a tool (see e.g. FIG. 1), a shaft part bearing a threaded cylinder 60 and a central bore which is configured for the reception of a flexible line 14.

The longitudinal grooves 42 which are provided at the outer side of the head part 58 are semi-circular in cross-section and run in regions 44 for the longitudinal grooves 42 are provided at the end face remote from the end of the threaded cylinder 60, said run in regions 44 tapering in a direction of the longitudinal grooves 42 and indeed preferably taper conically. This provision of the longitudinal grooves 42 in the head part 58 enables the engagement of the fastening tool 24 at the outer side of the head part 58 without the diameter of the head part having to be made unnecessarily large.

A cutout 46 is arranged between the head part 58 and the threaded cylinder 60 of the screw element 12 which is, in particular configured to receive a coding ring 22 or a like element. Such preferably color-coded coding rings enable a simple introduction of screw elements 12, e.g. into a housing, when the place of installation is coded with the same color (see e.g. FIGS. 4A and 4B). Such a screw element 12 is preferably made as a plastic or a metal injection-molded part and/or is produced as a (turned) automated part.

FIGS. 7A and 7B show a further view of a coupling part 24. In particular the FIG. 7A shows a perspective view. Also in this example a web 25 extends between the drive end 30 and the free end 26 bearing the projections 40. The angular extent of the web 25 about the longitudinal axis is smaller than the angular extent of the opening 38 about the longitudinal axis.

The coupling part 24 of the FIGS. 7A and 7B has been manufactured from an extruded part, preferably of an aluminum alloy. Such extruded parts can be produced very simply, quickly and cost-effectively. Thereafter, they are cut to the desired length and are provided with their opening 38. A slot-like opening 38 is configured in the ring 56 at the free end 26 remote from the handle, which slot-like opening has an angular extent and/or a width which is smaller than the angular extent of the ring 56 and/or of the circumference of the ring 56. Specifically, the slot-like opening 38 is dimensioned at least so wide in all embodiments and/or having an angular extent such that the respective line 14 can just be threaded in through the slot-like opening 38. Thus, a coupling part 24 can be produced particularly cost-effectively, simply and quickly.

As can be seen in the FIG. 7B projections 40 extend in an axial direction radially inwardly which can be coupled to a drive end 30 of a handle and/or of a torque wrench having a complementary shape 31. In the present example the arrangement of the projections 40 and the wall thickness of the tubular piece are selected in such a way that a hollow square shape 31 (see FIG. 7A) can be produced at the drive end 30 which can be coupled to a complementary square element. Also a different shape can be produced at and/or in the drive end 30 including an outer square or a different suitable drive shape.

Figure 8A:
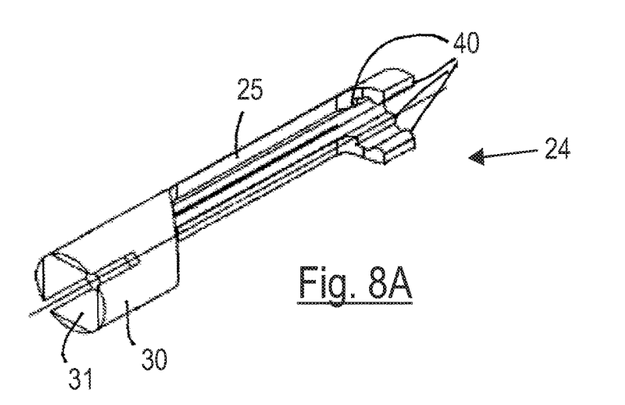
FIG. 8A to 8C show a further coupling part in accordance with the invention like that of FIGS. 7A and 7B.
Figure 8B:
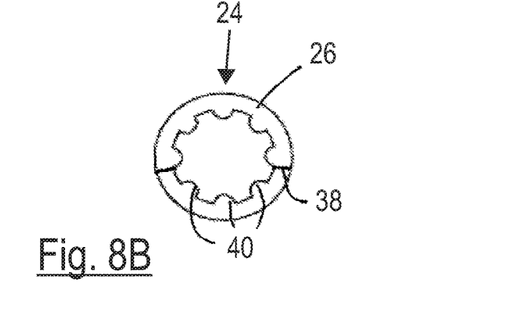
Figure 8C:
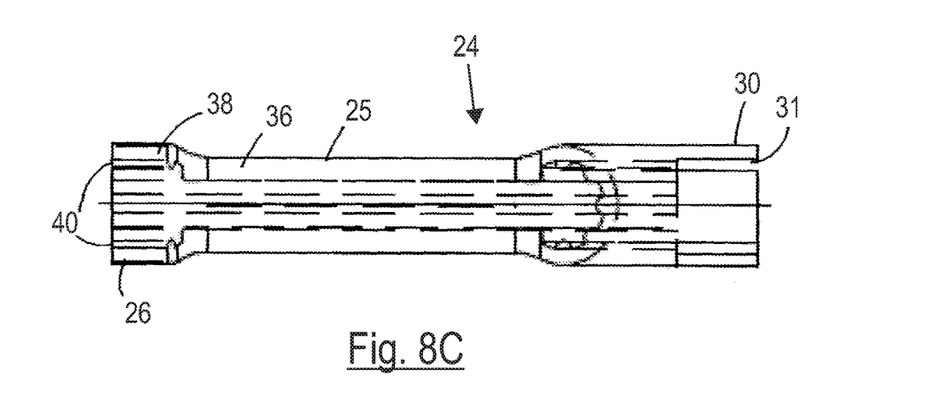

The FIGS. 8A to 8C show a coupling part similar to that of FIGS. 7A and 7B. The central difference is to be considered therein that the ring section 56 at the free end 26 has a larger angular extent, this means a larger circumferential length and thus better engages around the screw head. A further difference lies in the width of the web 25. In this example it is evident that more material has been cut away from the sidewall and/or cut out of the sidewall or has been omitted such that the web 25 has a significantly smaller angular extent than the cut away or left away region.

Also in this example the coupling part 24 generally has the shape of a tubular piece which in a side view has an extended in U-shape.

The screw elements shown in this connection can be common screw elements 12 having the sizes of e.g. M4, M5, M6, M7, M8, M9 or M10 or can also be produced in corresponding imperial or customary units. The screw elements 12 can, however, also have specifically manufactured sizes which are adapted to a respective threaded bore connector 48.

The invention claimed is:

1. A screw element having a head part which is configured for the engagement of a tool, having a threaded cylinder and having a central bore which is configured for the reception of a line, wherein the head part is provided with longitudinal grooves at its outer side extending in a longitudinal direction from an end face of the head part which longitudinal grooves are approximately semi-circular shaped in cross-section, and wherein run in regions for the longitudinal grooves are provided at the said end face, which run in regions taper in the direction of the longitudinal grooves, wherein the screw element is either configured as a hollow screw bolt or as a sleeve nut.

2. A screw element in accordance with claim 1, wherein it is configured as a hollow grub screw and the longitudinal grooves are arranged in a region of the grub screw forming the head part, and/or wherein the screw respectively the grub screw has a substantially constant outer diameter over its length, and wherein a cutout is provided between the head part and the threaded cylinder, and/or wherein the screw element is made as one of a plastic or a metal injection molded part and as a (turned) automated part.

* * * * *